United States Patent [19]

Postema et al.

[11] Patent Number: 6,068,790
[45] Date of Patent: May 30, 2000

[54] POLYOL FORMULATION FOR PRODUCING LATEX-LIKE FLEXIBLE POLYURETHANE FOAM

[75] Inventors: Aaldrik Roelf Postema, Amsterdam, Netherlands; Bernadette Elisabeth Schlenter, Louvain-La-Neuve, Belgium; Jeremy Hallam Shears, Louvain-La-Neuve, Belgium; Jean-Claude Noel Eliane Vandichel, Louvain-La-Neuve, Belgium

[73] Assignee: Shell Oil Company, Houston, Tex.

[21] Appl. No.: 08/762,810

[22] Filed: Dec. 9, 1996

[30] Foreign Application Priority Data

Dec. 7, 1995 [EP] European Pat. Off. ............ 95203400

[51] Int. Cl.$^7$ ..................................................... C09K 3/00
[52] U.S. Cl. ................. 252/182.27; 252/182.24; 524/762; 525/123
[58] Field of Search .................. 252/182.24, 182.27; 525/123; 524/762

[56] References Cited

U.S. PATENT DOCUMENTS

| | | |
|---|---|---|
| 4,008,189 | 2/1977 | van Leuwen et al. . |
| 4,226,756 | 10/1980 | Critchfield et al. . |
| 4,357,430 | 11/1982 | Van Cleve ................................ 521/128 |
| 4,855,330 | 8/1989 | Gastinger et al. ........................ 521/137 |
| 5,011,908 | 4/1991 | Hager ....................................... 528/392 |
| 5,124,368 | 6/1992 | Gill et al. ................................. 521/111 |

FOREIGN PATENT DOCUMENTS

| | | |
|---|---|---|
| 0 495 551 A2 | 7/1992 | European Pat. Off. . |
| 2129823 | 11/1972 | France . |
| WO 95/09886 | 4/1995 | WIPO . |

*Primary Examiner*—John M. Cooney, Jr.

[57] ABSTRACT

A polyol formulation is disclosed, the formulation including: (a) 80 to 99 parts by weight (pbw) of a polymer polyol comprising a base polyol having a molecular weight in the range of from 2,500 to 6,500, an average nominal functionality (Fn) of at least 2.0, an ethylene oxide content of 50 to 80%, and a primary hydroxyl content of at least 40% and a polymer stably dispersed therein; and, up to a total of 100 pbw, (b) 1 to 20 pbw of a hydrophilic polyol having a molecular weight in the range of from 2,000 to 5,500, an ethylene oxide content of at least 40% by weight and a primary hydroxyl content of at least 50%. The formulation may further include a tin catalyst and optionally a crosslinking agent and is very useful for producing latex-like polyurethane foams. These foams may be suitably applied in cushions (in e.g. car seats and upholstered furniture) or mattresses.

9 Claims, No Drawings

POLYOL FORMULATION FOR PRODUCING LATEX-LIKE FLEXIBLE POLYURETHANE FOAM

FIELD OF THE INVENTION

The present invention relates to a polyol formulation suitable for producing latex-like flexible polyurethane foams, to latex-like flexible foams obtained from this polyol formulation and to shaped articles comprising this polyurethane foam.

BACKGROUND TO THE INVENTION

Flexible polyurethane foams are widely used in numerous applications. Main sectors of application are automotive and aircraft industry, upholstered furniture and technical articles. For instance, full foam seats, top pads for the seats and restraints for back and head, all made from flexible polyurethane foam, are widely used in cars and aeroplanes. Other applications include the use of flexible polyurethane foam as carpet backings, foamed seat saddles for motorbikes, gaskets between a car body and its lights, lip seals of air filters for engines and insulating layer on car parts and engine parts to reduce sound and vibration. It will be appreciated that each specific application puts its own demands on the flexible foam to be used. Important characteristics in this connection are density, hardness, resilience and dampening behaviour of the foam and in order to fit each application, these characteristics should be optimally balanced and adjusted. The present invention aims to provide a polyol formulation suitable for producing flexible polyurethane foams having a latex-like stress/strain behaviour, i.e. a soft initial touch followed by a rapidly increasing support upon further compression of the foam combined with excellent resilience and foam hardness properties.

In International patent specification No. WO 95/09886 latex-like polyurethane foams are disclosed, which are obtained by reacting three different polyols, an isocyanate having a functionality of from 2.0 to 2.7 and an isocyanate index of 75 to 100, water and an auxiliary blowing agent and an amine catalyst. The polyols used are (i) a major amount of a triol polyol having a primary hydroxyl content of 50–80%, an ethylene oxide content of 10–25% and a molecular weight of 3,000–6,500; (ii) a minor amount of a polymer triol polyol having a molecular weight of 3,000–6,500 and (iii) a very minor amount of a triol polyol having a primary hydroxyl content of 50–90% and an ethylene oxide content of 40–90%. It would be advantageous from a cost perspective, if the number of polyols could be reduced, while still obtaining a flexible polyurethane foam exhibiting a latex-like appearance and behaviour. Furthermore, the option of using water as the sole blowing agent, whilst still being able to obtain a latex-like polyurethane foam, would be desirable from an environmental point of view and for reasons of process efficiency and economy. The present invention, accordingly, aims to reduce the number of polyols to be used and to offer the possibility of using water as the sole blowing agent, whilst still obtaining a latex-like polyurethane foam.

In U.S. Pat. No. 5,011,908 a polymer polyol composition for producing flexible polyurethane foams is disclosed, which composition comprises a major amount of high functionality polyol, a minor amount of a subsidiary polyalkylene oxide polyol and a stably dispersed polymer. The high functionality polyol suitably has an average nominal functionality of at least 3, an ethylene oxide content of between 8 and 25% and an equivalent weight of between 1,000 and 3,000. From the disclosure it is apparent that this high functionality polyol advantageously is a formulation of at least two different polyalkylene oxide polyols, as is most evidently demonstrated by the working examples. The subsidiary polyalkylene oxide polyol suitably has an average nominal functionality up to 8, an ethylene oxide content of between 30 and 100% and a molecular weight of between 450 and 30,000 with a clear preference for the lower molecular weight (450 to 2000) liquids. The formulation of both polyol components should have an average nominal functionality of at least 3.0. The polymer, finally, is present in an amount of from 2 to 50% by weight based on total weight of the polymer polyol components and can be any standard vinyl polymer or copolymer, a polyurea-type polymer or a condensation product of a polyfunctional glycol or glycol amine and a diisocyanate. Styrene-acrylonitrile polymers and styrene-acrylonitrile-vinylidene polymers are presented as the preferred polymers.

Although the flexible polyurethane foams produced from the polymer polyol composition disclosed in U.S. Pat. No. 5,011,908 exhibit a good resilience, the formulation used is relatively complicated, thus leaving a need for a more simple formulation. Furthermore, one of the objectives of this U.S. patent is to provide polymer polyol compositions for producing high resilience flexible polyurethane foams having densities below 1.8 pounds per cubic foot (i.e. below 28.8 kg/m$^3$), as is also clearly illustrated by the working examples. Finally, U.S. Pat. No. 5,011,908 is silent about any latex-like appearance or behaviour of the flexible foams disclosed. The present invention aims to provide a simplified polyol formulation, which enables the production of flexible polyurethane foams exhibiting an excellent resilience, even at higher densities (i.e. above 28.8 kg/m$^3$), while at the same time exhibiting the latex-like behaviour mentioned hereinbefore. More generally, the present invention aims to provide a polyol formulation from which flexible polyurethane foams can be prepared having a latex-like stress/strain behaviour, thus making these foams very suitable as cushioning material which can be used in numerous applications like the full foam seats, top pads for seats and restraints for back and head referred to above.

SUMMARY OF THE INVENTION

It has been found that all aims described above can be achieved by using a polyol formulation comprising a major amount of a specific polymer polyol and a minor amount of a hydrophilic polyol meeting certain requirements.

Accordingly, the present invention relates to a polyol formulation comprising: (a) 80 to 99 parts by weight (pbw) of a polymer polyol comprising a base polyol having a molecular weight in the range of from 2,500 to 6,500 an average nominal functionality (Fn) of at least 2.0 and a primary hydroxyl content of at least 40% an ethylene oxide content in the range of 10 to 30%, and a polymer stably dispersed therein; and (b) 1 to 20 pbw (to a total of 100 pbw) of a hydrophilic polyol having a molecular weight in the range of from 2,000 to 5,500, an ethylene oxide content of at least 40% by weight and a primary hydroxyl content of at least 50%.

The finding that the combination of a polymer polyol on the one hand and a hydrophilic polyol on the other hand results in a polyol formulation suitable for preparing latex-like polyurethane foams, is rather surprising, as these polyols are normally used separately for tuning the hardness of a polyurethane foam. A polymer polyol, namely, is known to be useful for increasing the hardness of a polyurethane foam, whereas hydrophilic polyols are known to be useful for decreasing the hardness.

In general, a polymer polyol is a dispersion of a solid polymer in a liquid polyol. Such systems are well known in the art and are normally prepared by polymerising one or more ethylenically unsaturated monomers in the presence of a free radical catalyst. Examples of such polymer polyol systems and methods for their preparation are disclosed in, for instance, European patent specifications Nos. 0,076,491; 0,343,907 and 0,495,551. Polyurea or polyurethane polymers are also known to be useful as the dispersed polymer in polymer polyols in stead of the polymers based on ethylenically unsaturated monomers.

DESCRIPTION OF A PREFERRED EMBODIMENT

For the purpose of the present invention a specific polymer polyol is used, whereby in particular the base polyol has to meet certain specific requirements. The base polyol used in component (a), then, is a polyol having a molecular weight in the range of from 2,500 to 6,500, an average nominal functionality (Fn) of at least 2.0 and a primary hydroxyl content of at least 40%. Preferred base polyols are those having in addition an ethylene oxide content in the range of from 5 to 50% by weight, preferably from 10 to 30% by weight and more preferably 15 to 25% by weight. It has been found particularly advantageous to use base polyols having a molecular weight in the range of from 3,000 to 6,000, a Fn in the range of from 2.5 to 6.0, and a primary hydroxyl content in the range of from 50 to 100%, more preferably from 70 to 95%. Very suitable base polyols, which are commercially available, are CARADOL MC 36-03 and CARADOL SA 36-01 (CARADOL is a trade mark).

The polymer dispersed in the base polyol, may in principle be any such polymer known to be applicable for this purpose. Thus, suitable polymers include the polymers based on ethylenically unsaturated monomers and particularly polymers of vinyl aromatic hydrocarbons, like styrene, alpha-methyl styrene, methyl styrene and various other alkyl-substituted styrenes. Of these, the use of styrene is preferred. The vinyl aromatic monomer may be used alone or in combination with other ethylenically unsaturated monomers, such as acrylonitrile, methacrylonitrile, vinylidene chloride, various acrylates and conjugated dienes like 1,3-butadiene and isoprene. Preferred polymers, however, are polystyrene and styrene-acrylonitrile (SAN) copolymers. Another suitable class of polymers are the polyurea and polyurethane polymers. Particularly the condensation products of polyhydric alcohol amines and aromatic diisocyanates are very useful in this respect. A very much preferred polymer is the condensation product of triethanol amine and toluene diisocyanate (TDI). The dispersed polymer is suitably present in an amount of from 5 to 40% by weight based on total weight of polymer polyol. In case the polymer is polystyrene or SAN polymer, preferred amounts are between 10 and 35% by weight, while in case of polyurea polyurethane polymers the preferred amount of polymer is between 5 and 20% by weight.

Examples of some commercially available polymer polyol compositions which may be suitably applied as component (a) of the polyol formulation according to the present invention, are described in International patent specification No. WO 95/09886. Examples, then, include the polyurethane polyols CARADOL SP50-01 and DESMOPHEN 7652, and also the polystyrene polyols CARADOL MD25-01 and CARADOL MD30-01 (CARADOL and DESMOPHEN are trade marks).

The polyol used as component (b) must be of a hydrophilic nature. This is one of the essential requirements for eventually obtaining a latex-like flexible foam as described hereinbefore. In addition, the hydrophilic polyol must meet several requirements as regards its molecular weight, ethylene oxide content and primary hydroxyl content. Suitable hydrophilic polyols must have a molecular weight in the range of from 2000 to 5500, an ethylene oxide content of at least 40% by weight and a primary hydroxyl content of at least 50%. Preferred hydrophilic polyols to be used as component (b) are those having a molecular weight in the range of from 3000 to 5000, an ethylene oxide content of from 50 to 80% by weight and a primary hydroxyl content of from 70 to 95%. Commercially available hydrophilic polyols meeting the above requirements are CARADOL MD36-02, DESMOPHEN 7040, VORANOL CP1421, ARCOL 2580 and TERCAROL 241 (CARADOL, DESMOPHEN, VORANOL, ARCOL and TERCAROL are trade marks).

In addition to the polymer polyol and the hydrophilic polyol, the polyol formulation may contain additional components and auxiliaries useful in the production of flexible polyurethane foams. For instance, the polyol formulation could additionally comprise a foaming catalyst and/or a crosslinking agent. Auxiliaries like fillers, flame retardants, foam stabilisers, blowing agents and colorants may be present as well. Conveniently, the polyol formulation further comprises ("php" refers to the amount in parts by weight per 100 parts by weight of polymer polyol plus hydrophilic polyol):

(c) 0.01 to 2 php of a polyurethane catalyst; and (d) 0 to 3.0 php of a crosslinking agent.

Polyurethane catalysts are known in the art and include many different compounds. An extensive list of polyurethane catalysts is, for instance, given in U.S. Pat. No. 5,011,908. For the purpose of the present invention, however, it has been found particularly advantageous to use a tin catalyst. Tin catalysts include tin salts and dialkyl tin salts of carboxylic acids, such as stannous octoate, stannous oleate, dibutyltin dilaureate, dibutyltin acetate and dibutyltin diacetate. Of these stannous octoate and dibutyltin dilaureate are most frequently applied. The tin catalyst most preferably applied for the purpose of the present invention is stannous octoate, as this catalyst has been found to result in a flexible foam having excellent properties, particularly in terms of resilience and density. In addition to the tin catalyst, one or more tertiary amine catalysts may also be applied. Such tertiary amine catalysts are widely used and include, for instance, bis(2,2'-dimethylamino)ethyl ether, trimethylamine, triethylamine, triethylenediamine and dimethylethanolamine. Examples of commercially available tertiary amine catalysts are those sold under the trade names NIAX, TEGOAMIN and DABCO (all trade marks). The catalyst is typically used in an amount of from 0.01 to 2.0 php. Preferred amounts of catalyst are from 0.05 to 1.0 php.

The use of crosslinking agents in the production of polyurethane foams is well known. Polyfunctional glycol amines are known to be useful for this purpose. The polyfunctional glycol amine which is most frequently used and is also preferred for use in the present polyol formulation, is diethanol amine, often abbreviated as DEOA. If used at all, the crosslinking agent is applied in amounts up to 3.0 php, but amounts in the range of from 0.2 to 1.5 php are most suitably applied.

Blowing agents may also be added to the polyol formulation. Suitable blowing agents include water, aceton, (liquid) carbon dioxide, halogenated hydrocarbons, aliphatic alkanes and alicyclic alkanes. Due to the ozone depleting effect of the fully chlorinated, fluorinated alkanes (CFC's) the use of this type of blowing agents is generally not preferred, although it is possible to use them within the scope of the present invention. The halogenated alkanes, wherein at least one hydrogen atom has not been substituted by a halogen atom (the so called HCFC's) have no or hardly any ozone depleting effect and therefore are the preferred halogenated hydrocarbons to be used in physically blown foams. A very suitable HCFC type blowing agent is 1-chloro-1,1-difluoroethane. The use of water as a (chemical) blowing agent is also well known. Water reacts with isocyanate groups according to the well known NCO/$H_2O$ reaction, thereby releasing carbon dioxide which causes the blowing to occur. The aliphatic and alicyclic alkanes, finally, were developed as alternative blowing agents for the CFC's. Examples of such alkanes are n-pentane and n-hexane (aliphatic) and cyclopentane and cyclohexane (alicyclic). The above blowing agents may be used singly or in mixtures of two or more. Of the blowing agents mentioned, water and carbon dioxide have been found to be particularly suitable as blowing agent for the purpose of the present invention. Of these, water is most preferred. The amounts wherein the blowing agents are to be used are those conventionally applied, i.e. between 0.1 to 5 php in case of water and between about 0.1 and 20 php in case of halogenated hydrocarbons, aliphatic alkanes and alicyclic alkanes.

In addition, other well known auxiliaries, such as flame retardants, foam stabilisers (surfactants) and fillers may also be used. Organosilicone surfactants are most conventionally applied as foam stabilisers in polyurethane production. A large variety of such organosilicone surfactants is commercially available. Usually, such foam stabiliser is used in an amount of up to 5% by weight based on the reaction mixture of polyol reactant and polyisocyanate reactant.

The polyol formulation according to the present invention is very useful for preparing flexible polyurethane foams. In order to prepare such flexible foam the polyol formulation is reacted with a polyisocyanate whereby the isocyanate index (i.e. the equivalence ratio of cyanate groups to hydroxyl groups) has a value in the range of from 80 to 120. Very good results have been obtained by reacting the polyol formulation and the polyisocyanate in such amounts that the isocyanate index was in the range of from 85 to 110.

Accordingly, the present invention also relates to flexible latex-like polyurethane foams obtainable by foaming a composition comprising a polyol formulation according to the present invention and a polyisocyanate component. In case the polyol formulation used only contains the polymer polyol and the hydrophilic polyol, catalyst, crosslinking agent, blowing agent and, if desired or deemed necessary, foam stabilisers and other auxiliaries, should be added separately to the polyol formulation, the polyisocyanate or the reaction mixture containing both. Hence, the composition from which the foam is eventually produced, suitably contains the following components:

(a) 80 to 99 pbw of a polymer polyol as defined above (b) 1 to 20 pbw, up to a total of 100 pbw, of a hydrophilic polyol as defined above (c) 0.01 to 1.0 php of a tin catalyst, preferably stannous octoate (d) 0 to 1.0 php of a tertiary amine catalyst (e) 0.2 to 1.5 php of a crosslinking agent, preferably DEOA, (f) 0.1 to 5 php of water as the blowing agent (g) up to 5% by weight of the total composition of an organosilicone foam stabiliser, (h) optionally other auxiliaries, and (i) a polyisocyanate component in such amount that the isocyanate index is in the range of from 80 to 120.

Of these components, components (a) and (b) are anyhow present in the polyol formulation of the present invention, while one or more of the components (c) to (h) may also be present in this polyol formulation.

Polyisocyanates that may be used are those conventionally applied in the production of flexible polyurethane foams. Useful polyisocyanates should contain at least two isocyanate groups and include both aliphatic -usually alkylene- and aromatic di-, tri-, tetra- and higher isocyanates known in the art to be suitably applied in the production of flexible polyurethane foams. Mixtures of two or more of such aliphatic and/or aromatic polyisocyanates may also be applied. Examples of suitably polyisocyanates, then, include 2,4-toluene diisocyanate (2,4-TDI), 2,6-TDI, mixtures of 2,4-TDI and 2,6-TDI, 1,5-naphthene diisocyanate, 2,4-methoxyphenyl diisocyanate, 4,4'-diphenylmethane diisocyanate (MDI), 4,4'-biphenylene diisocyanate, 3,3'-dimethoxy-4,4'-biphenylene diisocyanate, 3,3'-dimethyl-4, 4'-biphenylene diisocyanate and 3,3'-dimethyl-4,4'-diphenyl methane diisocyanate, 4,4',4"-triphenylmethane triisocyanate, 2,4,6-toluene triisocyanate, 4,4'-dimethyl-2,2', 5,5'-diphenylmethane tetraisocyanate, polymethylenepolyphenylene polyisocyanate and mixtures of two or more of these. Polymeric MDI, a mixture of polyisocyanates with MDI as the main component, may also be used. For the purpose of the present invention it has been found particularly advantageous to use 2,4-TDI, 2,6-TDI or a mixture thereof as the polyisocyanate component. Very good results have been attained with a mixture of 2,4-TDI and 2,6-TDI in a weight ratio 2,4-TDI:2,6-TDI of about 80:20. This mixture is commercially available as CARADATE 80 (CARADATE is a trade mark).

The flexible latex-like polyurethane foam according to the present invention may be produced as a slabstock foam or as a moulded foam.

Shaped articles, such as cushions (in e.g. car seats and upholstered furniture) and moulded mattresses as well as sound absorbing plates for use in e.g. cars, comprising the above flexible polyurethane foam also form part of the present invention.

The invention is now further illustrated by the following example, but without restricting the scope of the invention to these specific embodiments.

EXAMPLE

Two polyol formulations were prepared from the polyurethane polyol CARADOL SP50-01 and the hydrophilic polymer CARADOL MD36-02, which meet the requirements for the polymer polyol and hydrophilic polyol, respectively, as defined hereinbefore.

Both polyol formulations were subsequently blended into foam formulations FF-1 and FF-2 with water, an amine catalyst (NIAX B2; trade mark; ex Witco), stannous octoate as the tin catalyst, an organosilicone surfactant (TEGOSTAB B8681; trade mark; ex Goldschmidt AG), diethanolamine (DEOA) and CARADATE 80 as the polyisocyanate, after which the foam formulations were allowed to react to form latex-like polyurethane foams.

The composition of the polyol formulations, the composition of the foam formulations and the properties of the resulting latex-like polyurethane foams are listed in Table I.

Compression Load Deflection (CLD) is a measure for the stress-strain behaviour of the foam.

It is determined by compressing the entire area of the test specimen. The pressure (in kPa) required to attain a certain compression (in %) is the CLD.

From Table I it is clear that the fully water-blown polyurethane foam has a high density and an excellent resilience of more than 50%, whilst at the same time exhibiting a latex-like stress-strain behaviour, i.e. an soft initial touch -as is illustrated by the low pressure required to achieve a 5% compression- after which the support rapidly increases upon further compression, which is illustrated by the rapidly increasing pressure to attain from 20 to 70% compression.

TABLE I

Latex-like polyurethane foams

|  | FF-1 | FF-2 |
| --- | --- | --- |
| Polyol formulation |  |  |
| CARADOL SP50-01 (pbw) | 97 | 95 |
| CARADOL MD36-02 (pbw) | 3 | 5 |
| Water (pbw) | 1.75 | 1.74 |
| NIAX B2 (pbw) | 0.20 | 0.20 |
| Stannous octoate (pbw) | 0.20 | 0.20 |
| B8681 (pbw) | 0.19 | 0.19 |
| DEOA (pbw) | 0.61 | 0.60 |
| CARADATE 80 (pbw) | 23.5 | 23.5 |
| Isocyanate index | 90 | 91 |
| Density (kg/m$^3$) | 55.7 | 55.3 |
| Resilience (%) | 55 | 54 |
| CLD (kPa) |  |  |
| 5% | 0.8 | 0.9 |
| 20% | 1.6 | 1.7 |
| 40% | 2.3 | 2.4 |
| 60% | 4.6 | 4.6 |
| 70% | 8.4 | 8.5 |

We claim:

1. A polyol formulation suitable for preparation of foams, the formulation comprising:

(a) 80 to 99 parts by weight of a polymer polyol comprising a base polyol having a molecular weight in the range of 2,500 to 6,500 an average functionality in the range of 2.5 to 6.0, a primary hydroxyl content of at least 40%, an ethylene oxide content in the range of 10 to 30%, and a polymer dispersed therein; and (b) 1 to 20, up to a total of 100 parts by weight of (a) plus (b) of a hydrophilic polyol having a molecular weight in the range of 2,000 to 5,500, an ethylene oxide content of 50 to 80%, and a primary hydroxyl content of at least 50%.

2. The polyol formulation of claim 1, wherein the base polyol has a molecular weight in the range of from 3,000 to 6,000, and a primary hydroxyl content in the range of from 70 to 95%.

3. The polyol formulation of claim 1 wherein the base polyol has an ethylene oxide content in the range of from 5 to 50% by weight.

4. The polyol formulation of claim 1 wherein the polymer is polystyrene, SAN copolymer or the polyurethane polymer obtained as the condensation product of triethanolamine and toluene diisocyanate.

5. The polyol formulation of claim 1 wherein the hydrophilic polymer has a molecular weight in the range of from 3,000 to 5,000, an ethylene oxide content of from 50 to 80% by weight and a primary hydroxyl content of from 70 to 95%.

6. The polyol formulation of claims 1 which further comprises (c) 0.01 to 2 php of a tin catalyst; and (d) 0 to 3.0 php of a crosslinking agent.

7. The polyol formulation of claim 6 wherein the tin catalyst is stannous octonate.

8. The polyol formulation of claim 6 wherein the crosslinking agent is diethanolamine.

9. The polyol formulation of claim 7 wherein the crosslinking agent is diethanolamine.

* * * * *